United States Patent [19]

Beltran et al.

[11] 4,137,619

[45] Feb. 6, 1979

[54] METHOD OF FABRICATING COMPOSITE STRUCTURES FOR WATER COOLED GAS TURBINE COMPONENTS

[75] Inventors: Adrian M. Beltran, Ballston Lake; Myron C. Muth, Amsterdam; William F. Schilling, Niskayuna, all of N.Y.

[73] Assignee: General Electric Company, Schenectady, N.Y.

[21] Appl. No.: 838,726

[22] Filed: Oct. 3, 1977

[51] Int. Cl.² ............................................. B23P 15/04
[52] U.S. Cl. .......................... 29/156.8 H; 29/156.8 B; 29/157.3 C; 29/420.5; 416/95; 416/241 R; 75/226
[58] Field of Search ................... 29/156.8 H, 156.8 B, 29/157.3 C, 157.3 D, 420.5, 420; 416/96 R, 97 R, 95, 241 R; 75/226; 228/183, 193

[56] References Cited

U.S. PATENT DOCUMENTS

| | | | |
|---|---|---|---|
| 2,888,241 | 5/1959 | Stalker | 416/96 |
| 3,623,825 | 11/1971 | Schneider | 416/97 |
| 3,748,110 | 7/1973 | Hodshire et al. | 416/241 R |
| 3,773,506 | 11/1973 | Larker et al. | 75/226 |
| 3,928,901 | 12/1975 | Schilling et al. | 29/156.8 B |
| 3,952,939 | 4/1976 | Schilling et al. | 416/241 R |
| 4,017,210 | 4/1977 | Darrow | 416/97 R |

FOREIGN PATENT DOCUMENTS

| | | | |
|---|---|---|---|
| 2245705 | 3/1973 | Fed. Rep. of Germany | 228/183 |
| 1301524 | 12/1972 | United Kingdom | 228/183 |

*Primary Examiner*—C. W. Lanham
*Assistant Examiner*—Daniel C. Crane
*Attorney, Agent, or Firm*—Jerome C. Squillaro

[57] ABSTRACT

A method is provided for fabricating complex composite components for water-cooled, high temperature gas turbines. Each component comprises a core, a thermally conducting layer of copper bonded to the core, metal tubing through which water may pass embedded in and bonded to the layer, and a corrosion resistant cladding. The method utilizes powder metallurgy techniques to form the thermally conducting layer and hot isostatic pressure to bond the corrosion resistant cladding spar and tubes to said layer.

10 Claims, 5 Drawing Figures

METHOD OF FABRICATING COMPOSITE STRUCTURES FOR WATER COOLED GAS TURBINE COMPONENTS

BACKGROUND OF THE INVENTION

Structural arrangements for the open-circuit liquid cooling of gas turbine buckets are shown by Kydd, U.S. Pat. Nos. 3,445,481 and 3,446,482. The first patent discloses a bucket having cooling passages open at both ends which are defined by a series of ribs forming part of the core portion of the bucket and a sheet metal skin covering the core and welded to the ribs. The second patent discloses squirting liquid under pressure into hollow forged or cast turbine buckets. Another patent issued to Kydd, U.S. Pat. No. 3,619,076 describes an open circuit cooling system wherein a turbine blade construction consists of a central airfoil-shaped spar which is clad with a sheet of metal having a very high thermal conductivity, e.g. copper. The cladding sheet has grooves recessed in the sheet face adjacent to the spar, which grooves together with the smooth surface of the spar to define coolant passages distributed over the surface of the turbine blade.

There are some disadvantages in forming liquid cooling passages by bonding a sheet to a core in either of the configurations shown in U.S. Pat. Nos. 3,445,481 or 3,619,076. Thus, when a braze is used to bond the skin, some channels of the turbine buckets become plugged and obstructed with braze material. Excellent bonds are required between the core and the skin to contain the water in full channel flow under extremely high hydraulic pressures which result from the centrifugal forces during operation of the turbine. In addition, any cracks in the skin can cause leakage of the coolant and result in vane failure.

Many of the disadvantages of the prior art are overcome by the invention disclosed in the copending application of Anderson, "Liquid Cooled Gas Turbine Buckets", Ser. No. 749,719, filed on Dec. 13, 1976, of common assignee. Anderson discloses water cooled turbine buckets wherein the water-cooling channels are formed using preformed tubes which are located beneath an outer protective layer composed of an inner skin to provide high thermal conductivity and an outer skin to provide protection from hot corrosion.

Also Schilling, et al., U.S. Pat. No. 3,928,901 and Schilling, et al., U.S. Pat. No. 3,952,939 both disclose methods of attaching sheet cladding to a convex-concave substrate such as an air foil or a turbine bucket using isostatic pressing techniques. However, the procedures set forth in these Schilling patents when applied to the manufacture of turbine buckets incorporating preformed tubes will tend to collapse the tubes. Furhermore, when molten glass is used as the pressure transmitting medium as disclosed in U.S. Pat. No. 3,952,939, the molten glass is able to enter the tubes and is then difficult or almost impossible to remove without damage to the tubes.

SUMMARY OF THE INVENTION

In accordance with our present invention, we have discovered a method of making a water-cooled high temperature turbine component which comprises a core, a thermally conducting layer of copper bonded to the core, metal tubing through which water may pass embedded in the layer, and an outer corrosion resistant cladding. The method comprises forming a preshaped body including a spar and two rigid endwalls having openings extending through said endwalls and the endwalls being positioned so as to define a space between them. Thereafter a multiplicity of cooling tubes are placed along the surface of the spar such that the tubes extend through the openings of the endwalls. The predefined space is then enclosed with metal panels to form an internal cavity and the cavity is filled with copper or nickel powder. The powder is consolidated by hot isostatic pressing while maintaining the tubes open to gas pressure and the excess metal is removed by machining to form a heat conducting layer having cooling tubes embedded therein. Subsequently a corrosion resistant cladding is attached over the heat conducting layer.

BRIEF DESCRIPTION OF THE DRAWING

The invention is more clearly understood from the following description taken in conjunction with the accompanying drawing in which.

DESCRIPTION OF THE PREFERRED EMBODIMENT

Figure 1:
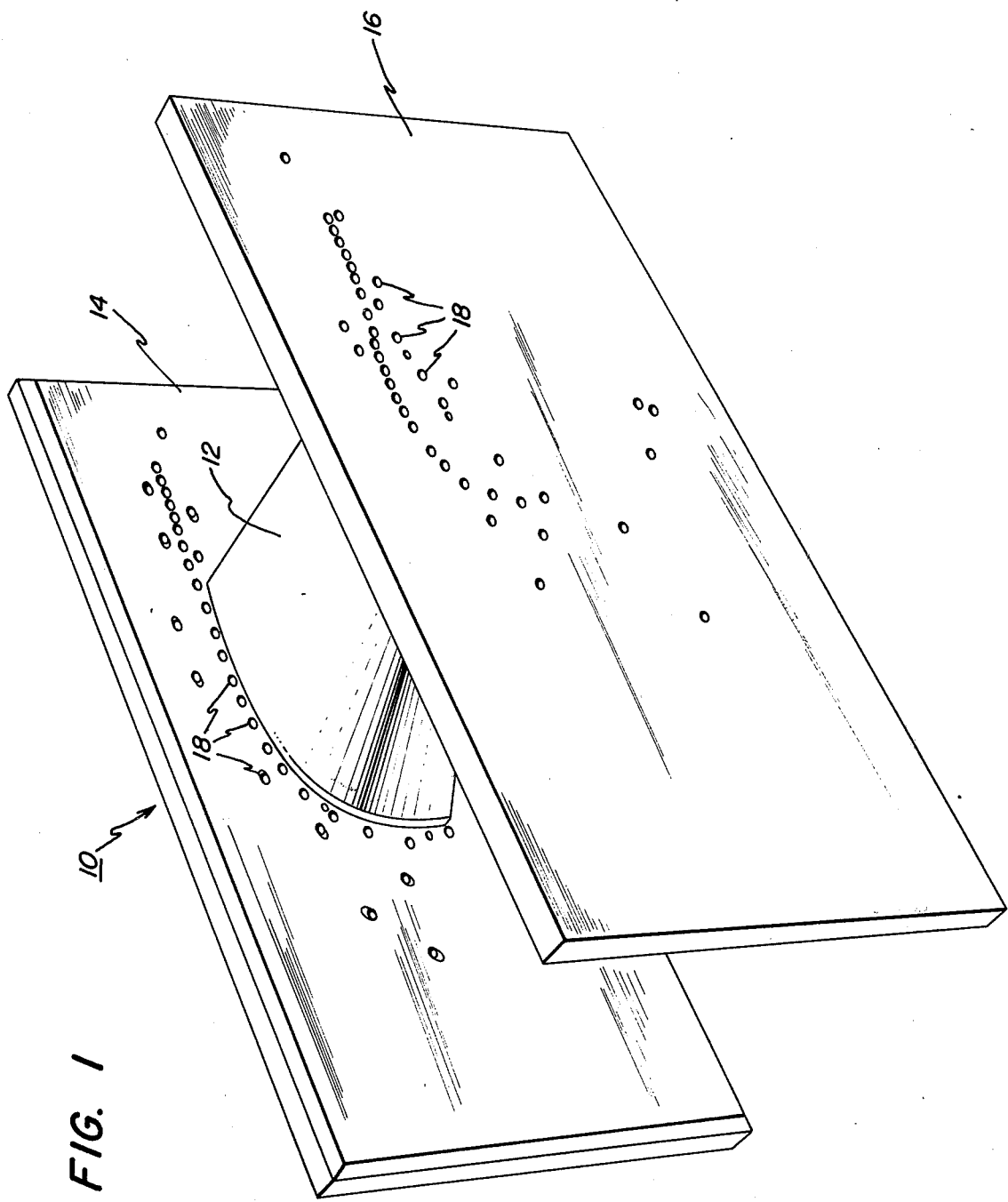
FIG. 1 is a three dimensional view of the spar/endwall assembly for the manufacture of a representative gas turbine nozzle with predrilled holes useful in the process of the present invention.
Figure 2:
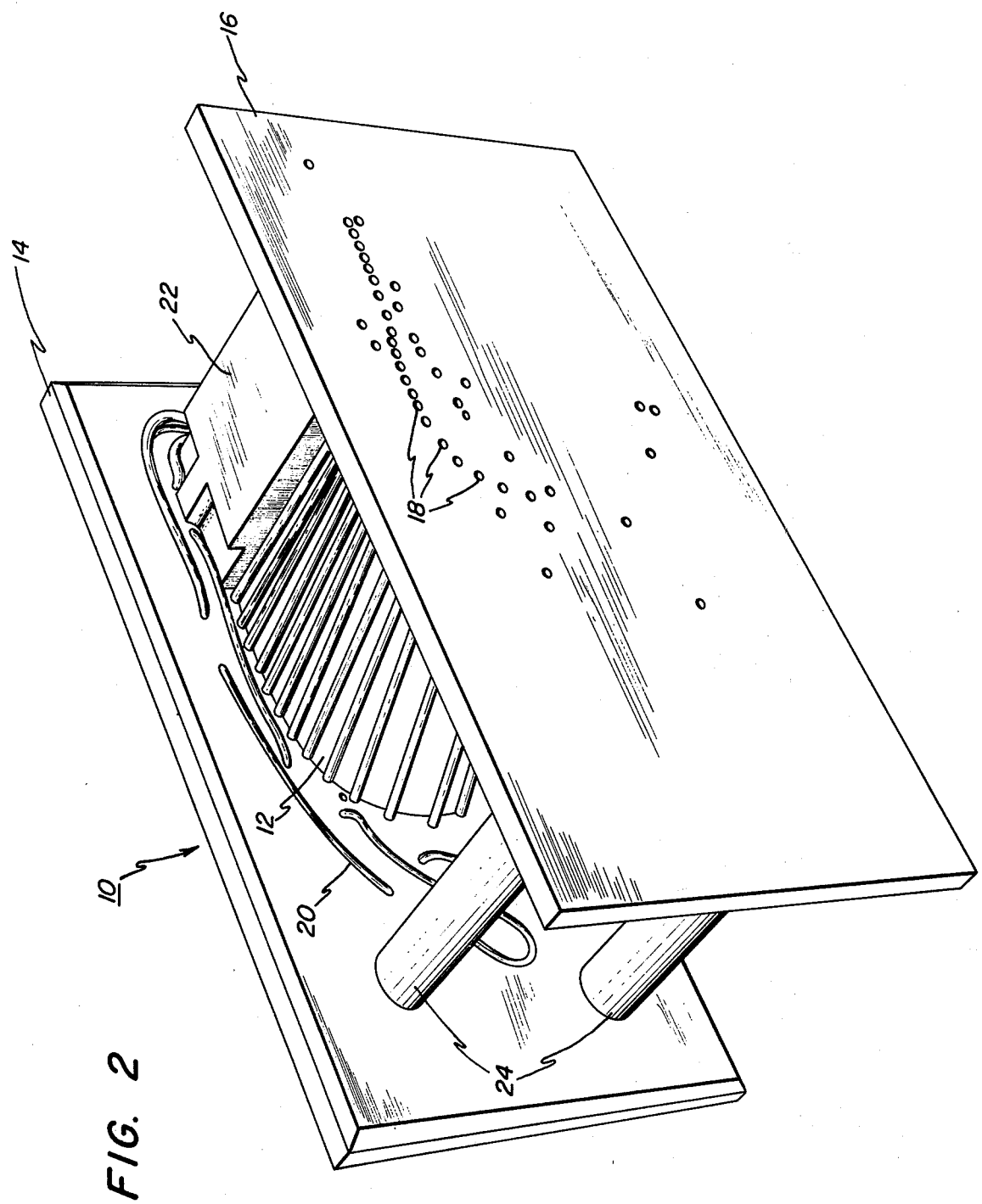
FIG. 2 is a three dimensional view of the spar/end wall assembly as shown in FIG. 1 with tubing and trailing edge block mounted thereon.

Referring to FIG. 1, an assembly 10 useful in the manufacture of a gas turbine nozzle is shown which consists of a spar 12 having attached at either end thereof endwalls 14 and 16 which are mounted parallel or concentrically to each other. These endwalls 14 and 16 have a multiplicity of holes 18 which are drilled or machined through said endwalls 14 and 16 at predetermined locations in the proximity of the spar 12. The next stage in the manufacture of a representative turbine nozzle is shown in FIG. 2 wherein a multiplicity of tubing 20 is attached to place through the holes 18 in the endwalls 14 and 16 and is located along the outer surface of the spar 12. In addition an edge block 22 having tubing (not shown) passing therethrough is mounted between the endwalls 14 and 16 at the trailing edge of the spar 12. The tubing sections 20, as shown, are thus spaced apart from each adjacent member thereof. Braces 24 are attached between the endwalls 14 and 16 to serve as a support between them and prevent movement during subsequent processing.

Figure 3:
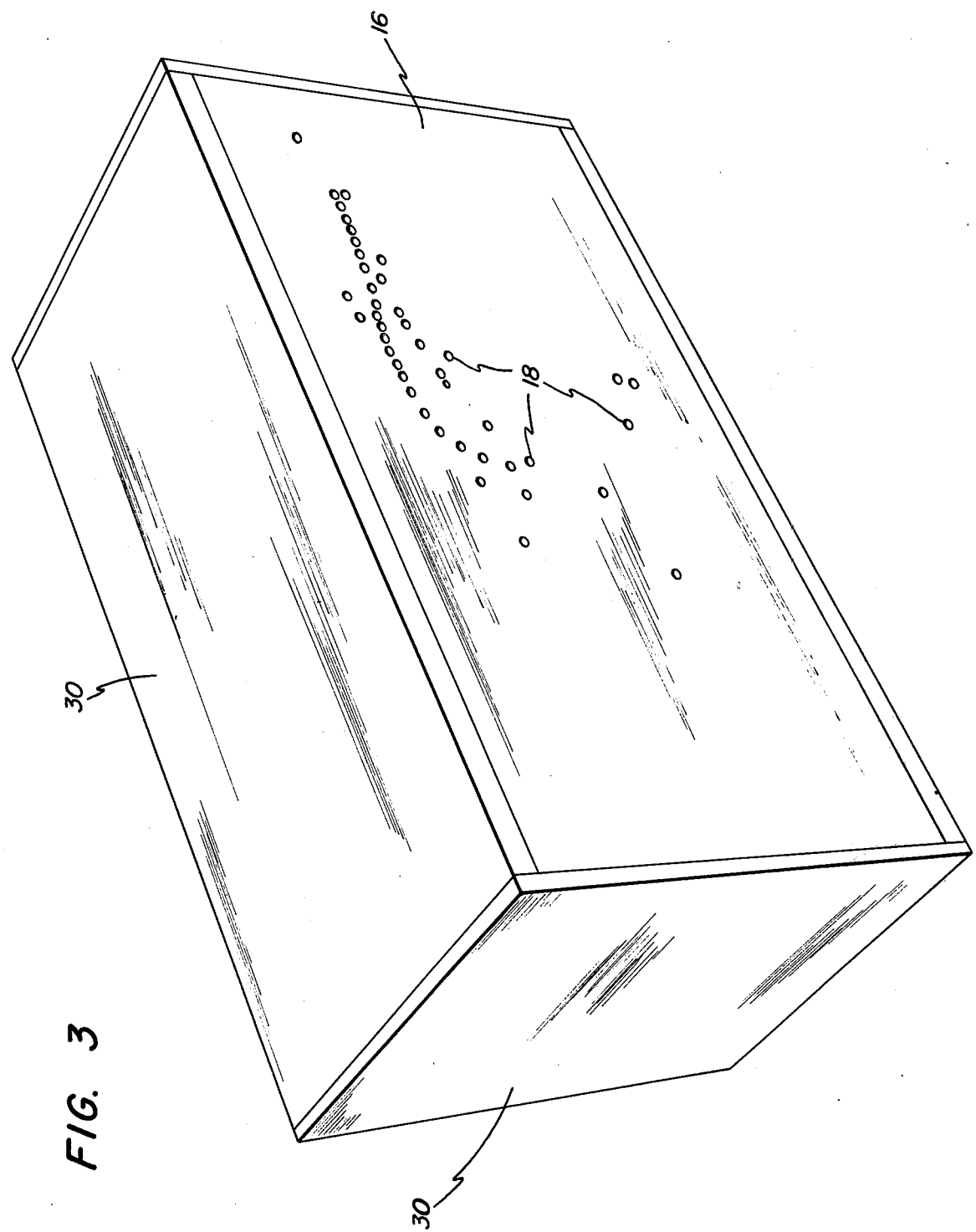
FIG. 3 is a view of the assembly of FIG. 2 enclosed with mild steel panels.

In FIG. 3 the assembly of FIG. 2 is enclosed in mild steel panels 30 leaving the holes 18 with the brazed in or welded tubing open. As shown in FIG. 3, the assembly of FIG. 2 is sealed to form an enclosure 30 which prior to completely sealing is filled with copper or nickel powder. The endwalls 14 (not shown) and 16 form two sides of the container. Thin sheets of mild steel panels 30 form the remaining four sides of the container and are welded to the endwalls 14 and 16 and to each other.

Figure 4:
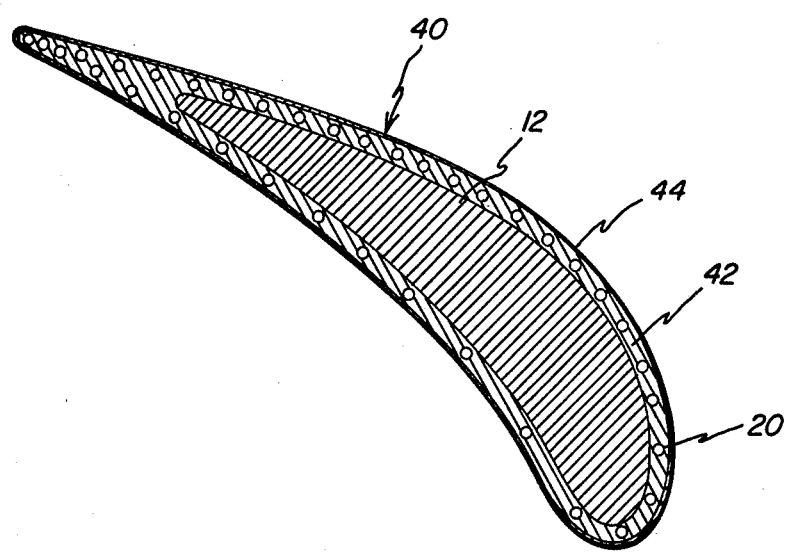
FIG. 4 is a cross sectional view of a representative gas turbine nozzle which may be prepared according to the process of our invention.

A cross sectional view of the spar section 40 of a representative nozzle is shown in FIG. 4. The spar 12 is surrounded on its outer surface by a sublayer of copper 42 which has embedded therein cooling tubing 20. The copper sublayer 42 which was formed by hot isostatic pressing of copper powder has been machined to its final shape and dimensions. A corrosion resistant cladding 44 covers the copper or nickel sublayer 42 to prevent corrosion from hot atmospheric gases which exist during the operation conditions of a gas turbine.

Figure 5:
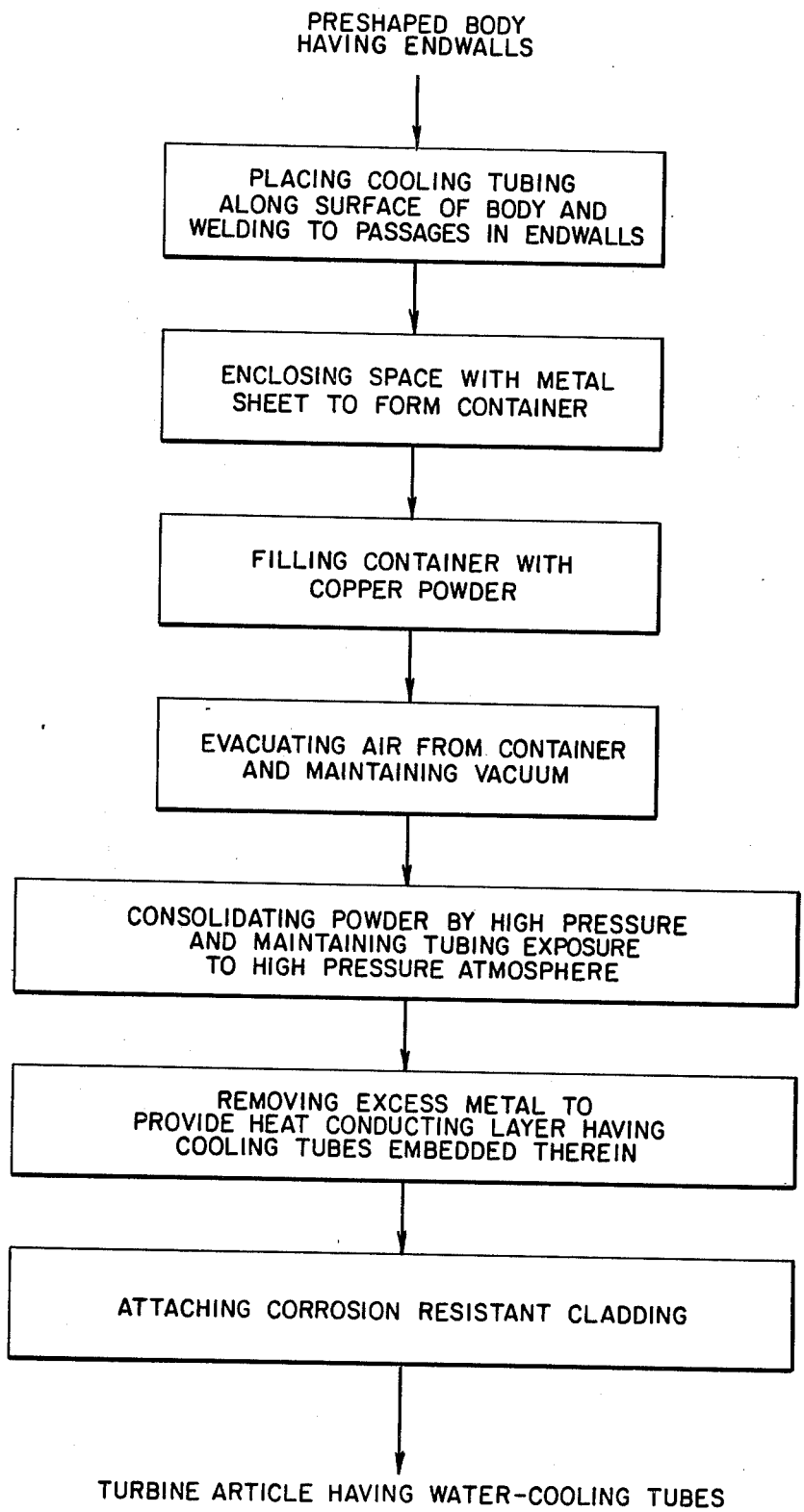
FIG. 5 is a flow sheet of our novel process.

FIG. 5 is a flow sheet of our novel process which we shall start to describe from the point that a preshaped body has been formed having endwalls. As an illustration, a preshaped body such as shown in FIG. 1, may be formed wherein the core structure is fabricated by welding airfoil and endwall sections, produced by investment casting or forging. A series of holes are drilled through endwalls, the diameter of which match the outside diameter of the water-carrying tubing. The core and tubing surfaces are prepared for subsequent bonding. Surface preparation includes glass blasting, vapor degreasing and perhaps nickel plating and vacuum heat treating. Tubing of appropriate composition and size is then bent in such a manner as to conform to the required placement and then exits through the prelocated holes in the endwall. Tubing for cooling the endwalls and airfoil are placed in this manner. The tubing is then welded or brazed on the exterior of each of the endwalls and the joint must be gas leak tight.

The nozzle endwalls are then utilized to form a container by welding mild steel panels to them. Prior to welding the last panel, the entire interior surface is cleaned by light glass bead blasting, hydrogen reduction or other suitable means. The container is vibratory filled with copper or copper alloy powder such as commercially available from ALCAN Aluminium Corporation as MD-Copper powders and from United States Metals Refining Company as AMAX metal powders. Alternatively, a nickel or nickel alloy powder may be used. The remaining mild steel panel with evacuation tube is then welded in place. Extreme care must be taken to avoid the contamination of the weld zone by copper powder. The entire assembly is vacuum leak checked.

The assembly is vacuum outgassed at an appropriate temperature and time, and then sealed off under vacuum from a vacuum system. The assembly is then placed directly in a hot isostatic press and consolidated under appropriate parameters which involves critical conditions of temperature, pressure and time. The temperature should be between 1500° and 1900° F. When the temperature is below 1500° the time becomes excessively long and when the temperature goes above 1900° F. a risk of melting the copper occurs. The useful pressure is in the range of 1-25 Ksi which depends upon the complexity of the shape involved. Also the lower the temperature, the greater the pressure. The times are in the range of ½ to about 4 hours which should be sufficient to densify the powder to theoretical density. During the HIP cycle, the copper powder densifies to about 100% of the theoretical density while simultaneously bonding the copper layer to the core and tubes. The cooling tubes, as indicated are open internally to autoclave pressure and, as such, are prevented from collapsing. After the HIP sequence, the mild steel panels are machined off and the desired nozzle surface machined into the copper layer.

Cladding of the final surface can be accomplished by one of several applicable methods. Thus, forming can be accomplished for example by the methods outlined in Schilling et al., U.S. Pat. No. 3,928,901. While the diffusion bonding is achieved by assembling the cladding onto the copper sublayer of the assembly and making all welds leak tight in the cladding to totally encapsulate the substructure in the cladding. Diffusion bonding can then be effected by a hot isostatic pressing cycle. The preferred cladding materials are nickel-chromium alloys, such as those commercially available from the International Nickel Company under the designation of IN-671 and IN-617. These nickel-chromium alloys consist essentially of 50-80% by weight of nickel and 20-50% by weight of chromium, with a preferred composition being Ni-50Cr. The more complex alloys contain a number of elements and are represented by IN-617 which has the following formulation:

| ELEMENT | WEIGHT PERCENT |
| --- | --- |
| Chromium | 22% |
| Aluminum | 1% |
| Cobalt | 12.5% |
| Molybdenum | 9% |
| Boron | .003% |
| Carbon | .07% |
| Nickel | Balance |

Our invention is further illustrated by the following examples:

EXAMPLE I

The experiment was designed to demonstrate the feasibility of the method outlined above on a composite structure which had many of the key features required by the current design. A core structure was weld fabricated with 304 stainless steel endwalls and airfoil. Prior to welding, ⅛" holes were drilled through the endwalls at predetermined locations. After welding of the endwalls to the airfoil, ⅛" O.D. × 0.035" wall 347 stainless steel tubes were placed through the drilled holes along the concave face of the airfoil. In addition, tubing was bent in such a manner as to bracket the airfoil at its intersection with the endwall. All tubes were welded into the exterior endwall surface.

Mild steel plates 1/16" in thickness were welded to the endwalls in such a manner as to form a container the inside of which included the airfoil/tube assembly. Prior to welding of the last panel, the entire assembly was annealed in dry hydrogen at 1900° F. (1037° C.) to remove all surface oxide films. The can was filled with electrolytic copper powder which had an apparent density of 3.2g/cm$^3$ (36% of theoretical). The final panel which had an evacuation tube welded in place was then welded to the last endwall surface to give a fully welded container. This assembly was then mass spectrometer leak tested at all welded joints to insure leak tightness. The container was hot outgassed at 1000° F. (538° C.) for 40 hours prior to forge-welding of the evacuation tube.

The assembly was hot isostatically pressed at 1800° F. (982° C.)/15 Ksi/2 hours. After removal from the autoclave, the can was allowed to cool to room temperature in air. The can was x-rayed after pressing, which showed some tube movement had occurred, however tube collapse was avoided. Further visual examination indicated a tear in the mild steel can had occurred during the autoclave cycle. This was verified by metallographic examination which showed the powder to be about 90% dense, while partial bonding of the copper to the stainless steel surfaces had been achieved. Nonetheless, this experiment confirmed that a powder metallurgy approach involving the simultaneous densification and bonding of copper or copper alloy powders to a complex core structure containing tubes is feasible.

EXAMPLE II

This experiment was conducted to ascertain the ability of this technique to completely bond and densify copper powder to a configuration which was representative of that used in Example I. Further this experiment was to evaluate bondline structures, the structure of the densified copper and to verify that a high level of electrical conductivity (and thus thermal conductivity) could be achieved by powder metallurgy techniques. A somewhat simpler structure consisting of two endwalls, a center strut and four tubes were used for this experiment. All surfaces were plated with 1-2 mils of nickel and vacuum heat treated at 1900° F. (1038° C.)/1 hour. As in the case of Example I, a mild steel container was weld fabricated around the endwalls and the welds cleaned by glass blasting. The can interior was filled with −60 mesh argon atomized, OFHC copper powder and the top cover/evacuation tube welded in place. Extreme care was taken to avoid the inclusion of copper into the weld metal. After welding, the assembly was leak checked, vacuum outgassed and forge-weld sealed.

Prior to hot isostatic pressing the assembly was cold isostatically pressed at 60 Ksi in order to predensify the copper and eliminate a major fraction of can wall movement during the hot isostatic pressing cycle. The compact was hot isostatically pressed at 1800° F. (982° C.)/10 Ksi/2 hrs.. Afterwards, the temperature was dropped to 1112° F. (600° C.) while maintaining pressure and the compact was removed from the autoclave and allowed to air-cool. Complete densification and bonding was evident. The structure of the copper/stainless steel tubing bondline was of excellent quality. The overall structure of the densified copper powder is very similar to that of fully annealed wrought copper. The electrical conductivity of the densified copper was measured to be 100% IACS.

This experiment has verified the applicability of the powder metallurgy bonding technique for fabrication of complex/composite components, capable of accepting water cooling, for ultra high temperature turbine hot gas path hardware.

It will be appreciated that the invention is not limited to the specific details shown in the examples and illustrations and that various modifications may be made within the ordinary skill in the art without departing from the spirit and scope of the invention.

We claim:

1. A method of making a water-cooled, high temperature turbine article comprising the steps of:
   a. forming a preshaped body comprising a spar and two rigid endwalls having openings extending through said endwalls and said endwalls extending beyond said spar and defining a space between them,
   b. placing a multiplicity of cooling tubes along locations on the outer surface of said spar and extending through the openings of the endwalls, and forming a leak tight joint between the tubing and the endwalls,
   c. enclosing the predefined space with metal panels to form an internal cavity with the spar and cooling tubes therein;
   d. filling the internal cavity between the metal panels and the spar with a metal powder selected from the group consisting of copper, copper alloy, nickel and nickel alloy,
   e. consolidating the powder by hot isostatic pressing while maintaining said tubes open to gas pressure,
   f. removing the excess metal by machining to form said turbine article with a heat conducting layer having cooling tubes embedded therein; and
   g. attaching a corrosion resistant cladding over said heat conducting layer.

2. The method of claim 1, wherein said body is cast from an alloy selected from the group consisting of a nickel-base alloy, and a chromium-nickel-iron alloy.

3. The method of claim 2, wherein said tubes are formed from a chromium-nickel-iron alloy.

4. The method of claim 2, wherein said tubes are monel.

5. The method of claim 2, wherein said corrosion resistant cladding is an alloy consisting essentially of 50–80% by weight nickel and 20–50% by weight chromium.

6. The method of claim 1, wherein said metal powder is copper or copper alloy.

7. The method of claim 1, wherein said powder is nickel or nickel alloy.

8. The method of claim 1, wherein said hot isostatic pressing occurs at a temperature of about 1500°–1900° F., at a pressure of 1–25 Ksi and for a time of 0.5–4 hours to provide substantially theoretical density.

9. The method of claim 8, wherein said body is cast from a chromium-nickel-iron alloy, said powder is copper and said corrosion resistant cladding is Ni-50Cr.

10. The method of claim 8, wherein said hot isostatic pressing occurs at 1800° F., at 10 Ksi and for 2 hours.

* * * * *